United States Patent [19]

Ulrich

[11] 4,161,348
[45] Jul. 17, 1979

[54] PREASSEMBLED FIBER OPTIC SECURITY SEAL

[75] Inventor: Reinhard R. Ulrich, Rockville, Md.

[73] Assignee: The United States of America as represented by the Secretary of the Army, Washington, D.C.

[21] Appl. No.: 823,077

[22] Filed: Aug. 9, 1977

[51] Int. Cl.² ............................................. G02B 5/16
[52] U.S. Cl. ................... 350/96.20; 70/440; 350/96.24; 292/307 R
[58] Field of Search ............... 350/96.24, 96.10, 96.20; 70/440; 392/307 R

[56] References Cited
U.S. PATENT DOCUMENTS
3,854,792  12/1974  Koelle .......................... 350/96.24

Primary Examiner—Conrad J. Clark
Assistant Examiner—Stewart Levy
Attorney, Agent, or Firm—Nathan Edelberg; Robert P. Gibson; Saul Elbaum

[57] ABSTRACT

The invention is directed to a security device which detects tampering with a secured closure. A fiber optic bundle is looped through a closure and secured at opposite ends of the bundle to a snap-together connector. An intermediate length of the fiber optic bundle surrounds the snap-together connector preventing access to its locking mechanism unless fibers are severed. After installation, light is passed through the fiber optics and a particular pattern is generated at a viewing end of the connector. Tampering with the closure will cause individual fiber optics to be disturbed or cut so that subsequent viewing of the fiber optics will generate a different viewing pattern than originally observed.

10 Claims, 5 Drawing Figures

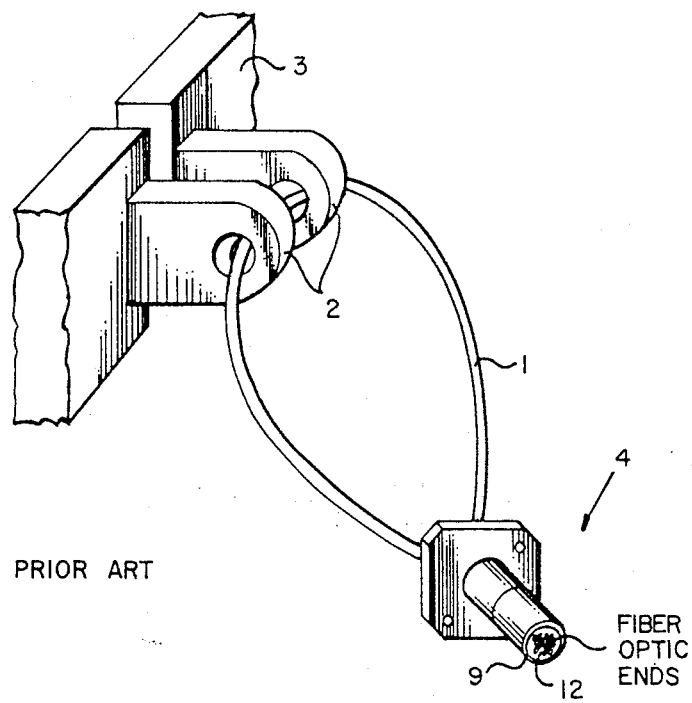
PRIOR ART
FIG. 1
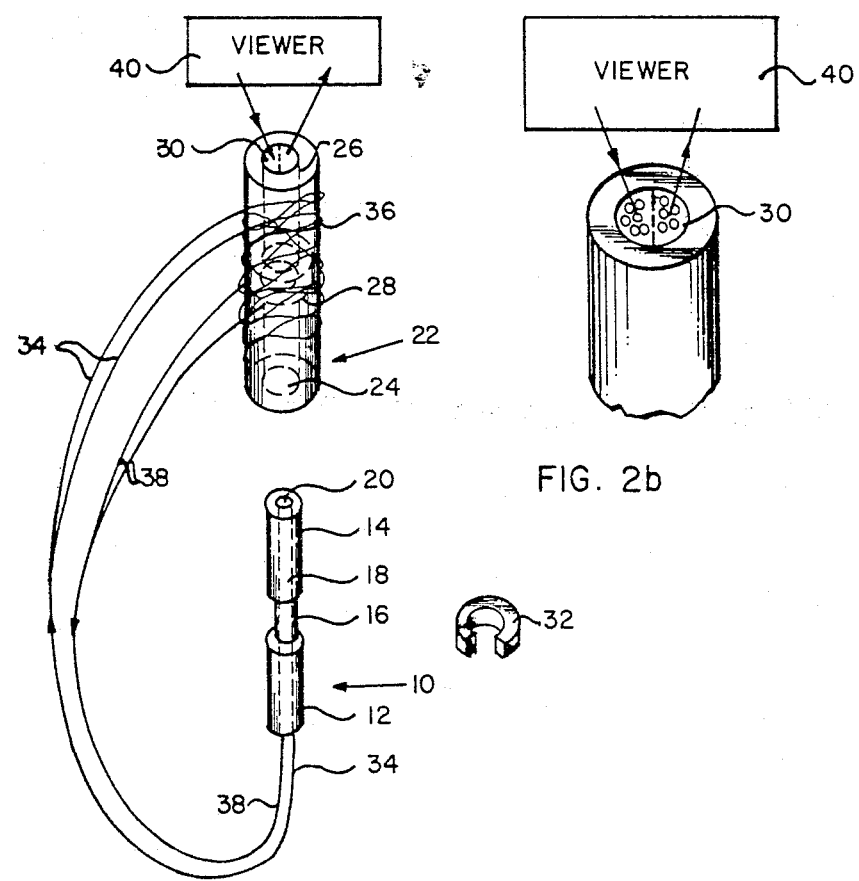
FIG. 2a
FIG. 2b

PREASSEMBLED FIBER OPTIC SECURITY SEAL

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to security devices and more particularly to a security device for detecting tampering of a closed object or movement of a secured object. Disturbance of individual fibers in a fiber optic bundle is utilized to detect tampering.

BRIEF DESCRIPTION OF THE PRIOR ART

Many different types of ties have been long used for sealing enclosures and locked objects. Often a wire loop and metal seal are employed. If the enclosure is tampered with, the seal is torn or otherwise defaced to indicate tampering. Although such mechanical means are often satisfactory, it is a relatively simple matter to replace the seal with an identical seal so that tampering may go undetected.

The prior art has recognized that fiber optics may be employed as a seal which inherently detects tampering. U.S. Pat. No. 3,854,792 is directed to a fiber optic bundle which is passed through clamps on an object to be secured. One end of the fiber optic bundle is masked and illuminated so as to produce a particular output light pattern at the other end of the bundle. This output light pattern is recorded and the seal may be checked again and again by illuminating the masked end, and checking the light pattern at the other end for similarity with the initial recorded pattern. In addition to the disadvantage of having to install a mask, this patent requires the separated bundle ends to be epoxied in fiber securing or fixing anchors, at each end of the bundle. As a result, it will be appreciated that the prior patented security seal is inconvenient and time consuming to use.

In a co-pending application, Ser. No. 759,161, filed Jan. 13, 1977, an improvement of the described prior art was disclosed. In the co-pending application, there is disclosed a collar for collecting the output ends of a fiber optic bundle loop. The collar employs a flexible ferrule for compressing the outward ends of the loop together to form an arbitrary pattern of intermingled fibers. When light is passed through the fiber optics, the individual intermixed fibers generate a unique "fingerprint" or pattern which may be viewed at the collar. The invention disclosed in the co-pending application utilizes an appropriate compressible ferrule which retains the individual fibers together yet does not exert sufficient shearing force to destroy individual fibers.

BRIEF DESCRIPTION OF THE PRESENT INVENTION

The present invention is an improvement of the fiber optic device disclosed in the co-pending application. Although the co-pending device operates satisfactorily, it requires assembly in the field. It has been determined that it would be much more advantageous if a preassembled device were available. The present invention satisfies such a requirement by including a snap-together connector which maintains opposite ends of the fiber optic bundle. Thus, in order to use the present invention in the field, it need only require snap-together connection. The snap-together connector is made tamper-resistant by surrounding it with an intermediate length of the fiber optic bundle in such a fashion that fibers must be severed in order to gain access to the locking mechanism.

BRIEF DESCRIPTION OF THE FIGURES

The above-mentioned objects and advantages of the present invention will be more clearly understood when considered in conjunction with the accompanying drawings, in which:

FIG. 1 is a perspective view illustrating the fiber optic device of the prior art.

FIG. 2a is a simplified view of illustrating the basic concept of the present invention.

FIG. 2b is a view detailing one aspect of the concept of FIG. 2a.

DETAILED DESCRIPTION OF THE INVENTION

Figure 3:
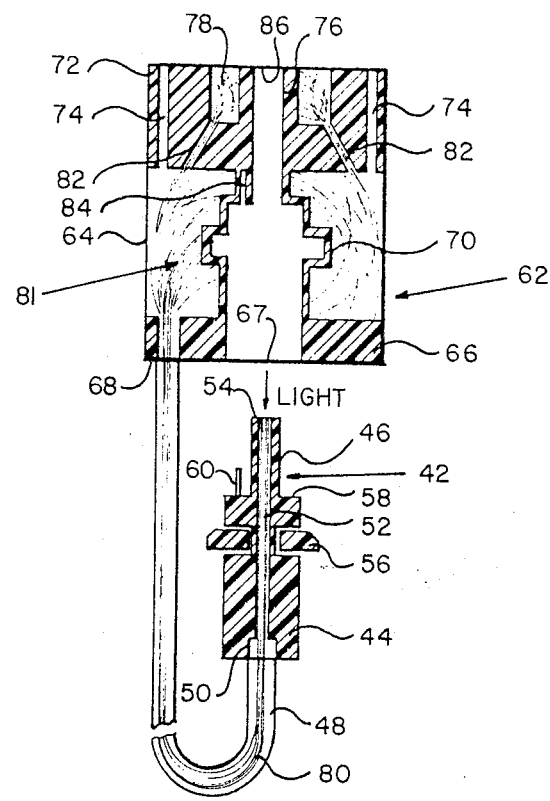
FIG. 3 is a cross-sectional view of a first embodiment of the present invention.

Referring to the figures, and more particularly FIG. 1 thereof, a prior art fiber optic seal, as disclosed in the mentioned co-pending application is shown. The fiber optic bundle 1 of many small randomly oriented fibers forms the heart of the fiber optic seal. The fiber optic bundle is passed through the apertured flanges 2 provided for sealing the container or item 3 to be secured. The two ends of the bundle are looped together with the fibers intermixed and fed into a common collar 4. When light is directed on a portion of the randomly distributed intermixed fibers that pass through the collar, a unique pattern or "fingerprint" is formed at the collar end. This unique fingerprint is utilized to ensure that the seal is tamper-resistant/tamper-indicating. Since the seal is looped upon itself with the fibers intermixed, opening the seal requires either cutting the fiber optic bundle 1 or removing the fibers from the collar 4. In either case the seal's unique fingerprint is destroyed. The random orientation, striation marks and complexity of the lit fiber ends insures the uniqueness of the seal fingerprints, and makes it highly improbable that the seal can be replaced in the field without indications of tampering.

FIG. 2a illustrates the basic concept of the present invention. Reference numeral 10 generally indicates a first connector having a lower cylindrical portion 12 and an upper cylindrical portion 14 separated by an intermediate stepped down portion 16. An axial bore 18 is longitudinally formed through the entire connector 10 and receives a fiber optic bundle which is doubled up, at its ends, within the connector 10. The free ends of the fiber optic bundle appear at opening 20 in the connector 10. A second connector, generally indicated by reference numeral 22, receives the connector 10 when the seal is closed. A recess is formed in the connector 22 to match the surface configuration of the connector 10. Thus, recess portion 24 receives the lower cylindrical portion 12. In a similar manner the recess 26 receives the cylindrical portion 14 of connector 10. A central recess 28 is formed in connector 22 to receive a split retainer ring 32 which is positioned around the stepped down portion 16 of connector 10 prior to installation or closing of the seal. During installation, the entire connector 10 is pushed into the connector 22 and the split retainer ring 32 is forced outwardly to expand within the recess 28 of connector 22. Locking action between the connectors 10 and 22 are thus achieved. A first length of the fiber optic bundle is indicated at 34. An outward end of this bundle length appears at opening 20 in connector 10 while the intermediate length of the fiber optic bundle is spread out and intertwined, as shown at 36, around the outside of the connector 22. The fiber optic bundle is then returned along length 38 to the connector 10 where its outward end is also positioned at opening 20. Opening 30 in the connector 22 coincides with the opening 20 in connector 10 after the seal is closed by simply pushing the connector 10 into connector 22. Thus, it is possible to position a viewer 40 against the opening 30. The viewer may operate in the same manner as discussed in the mentioned co-pending application. Briefly, a light source shines light through one-half of the opening 30, thus impinging on approximately half of the optic fiber ends as shown more clearly in FIG. 2b. This is accomplished by a light splitting technique disclosed in the co-pending application. The remaining half of the optic fiber ends terminate at 30 in a viewing plane whereby a "fingerprint" may be inspected. If any of the strands or optic fibers are cut after the seal is installed, a change in the "fingerprint," from the time of installation, to the time of inspection, will become manifest thereby indicating tampering.

FIG. 3 illustrates a first embodiment of the invention wherein protective covering of the exposed optic fibers is achieved. Referring to FIG. 3 a connector 42 is generally illustrated as a cylindrical member having a first cylindrical portion 44 which steps down to a second cylindrical portion 46. A fiber optic bundle 48 is received within the connector 42. The outwardly illustrated sheathing of the fiber optic bundle 48 terminates within a recess 50 of the connector 42. Individual optic fibers 80 extend longitudinally intermixed through the connector 42 up to the opening 54 where the co-planar ends of individual optic fibers 52 appear.

A chamfered split retaining ring 56 is received within an annular recess formed in the cylindrical portion 44 of connector 42. The connector 42 has a shoulder 58 which separates the cylindrical portions 44 and 46. The shoulder mounts a locating pin 60 which is received in a mating recess 84 which is formed in the enlarged connector 62.

The connector 62 has the advantage of protectively covering an intermediate length of the individual optic fibers. The connector 62 has a cylindrical wall 64 that is hollow on the inside and is bounded on a lower surface by a disc 66. An opening 67 is formed in the disc 66 to receive the connector 42. A second opening 68 is formed in the disc 66 to permit the passage of the optic fiber bundle through the disc 66 where individual optic fibers are unraveled from the bundle and are wrapped around a cylindrical stepped member 70 which mates with the connector 42. Individual optic fibers are then returned through opening 68 and the length of the bundle to the opening 54 so that a complete loop is effected. The individual optic fibers are secured and protectively covered in the hollow between the cylindrical wall 64 and the cylindrical stepped member 70 by a layer or layers (not shown) of epoxy or other suitable bonding material.

Bores 74 are formed in the disc 72 to permit locating pins (not shown) on a viewer, as described in connection with FIGS. 2a and 2b, to be positioned in precise registry with an opening 86 in the connector 62. The disc 72 has a centrally located bore 76 formed therein for receiving the cylindrical portion 46 of connector 42. By providing the bores 74, precise registry may be obtained between a viewer and the opening 54 in connector 42, when the seal of FIG. 3 is closed. An additional inspection facility is provided by intentionally breaking some of the optic fibers during preassembly of the seal. These individual fibers such as 82 are terminated in an annular window 78 that surrounds the opening 86. Accordingly, a fingerprint may then be obtained at the opening 54 of connector 42 as well as the annular window 78 in connector 62. If tampering were to occur by drilling through disc 72, this would probably cause the breakage of optic fibers 82. Although this might not be detected by the breakage of optic fibers at 81, it would be detected by the breakage of optic fibers 82 thereby altering a "fingerprint" appearing at window 78. As in the illustration of FIGS. 2a and 2b, the seal is easily installed in the field by simply pushing the connector 42 into engagement with the connector 62 thereby causing the split retaining ring 56 to expand within the connector 62 thereby locking the connectors 62 and 42 together.

Figure 4:
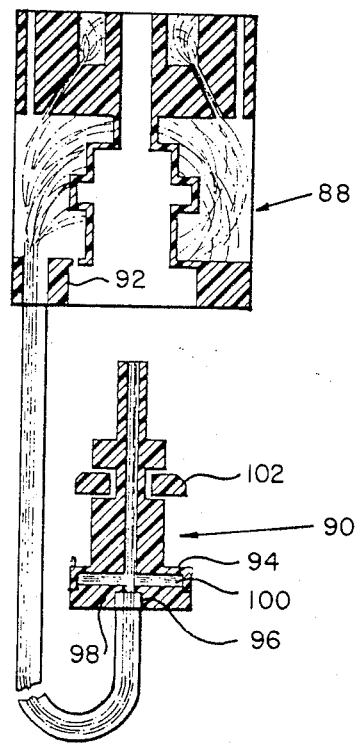
FIG. 4 is a cross-sectional view of a second embodiment of the present invention.

FIG. 4 shows a second embodiment of the invention with slightly modified connectors 88 and 90. As will be observed, these connectors generally resemble their corresponding connectors shown in FIG. 3. However, in order to make it more difficult for the insertion of a tool into a closed seal for purposes of releasing a retainer ring, a stepped down cylindrical recess 92 is formed inwardly of the connector 88. The connector 90, when compared with the connector 42 of FIG. 3, includes an additional cylindrical portion 94 which is received within the recess 92. An opening 96 is formed in a disc 98, the latter being epoxied or otherwise attached to the enlarged cylindrical portion 94. The opening 96 receives a corresponding end of the fiber optic sheath for securing the sheath. Individual optic fibers extend axially to an upper end of the connector 90, as in the case of connector 42 in FIG. 3.

An opening 100 exists in connector 90 and receives individual spread out strands of the optic fiber bundle therein. The purpose of spreading out the optic fibers in the opening 100 is to position exposed optic fibers in a manner in which they will be cut if a drill or other tool is forced into a closed seal through the disc 98, in a direction toward the split retainer ring 102.

From the above description, it will be appreciated that the improved embodiments of the present invention make it easier to use a fiber optic seal in the field due to the preassembly thereof prior to installation on an article to be locked. In order to install the device as a seal, all that need be done is the insertion of one connector into another.

I wish it to be understood that I do not desire to be limited to the exact details of construction shown and described, for obvious modifications can be made by a person skilled in the art.

I claim the following:

1. A preassembled fiber optic seal comprising:
a fiber optic bundle;
a first connector for securing the outward ends of the bundle together, whereby individual fibers of the bundle are randomly positioned within the connector;
a second connector having an intermediate length of individual fibers wrapped therearound;

means for permanently securing the first connector to the second connector;

an opening formed in the second connector, the opening positioned in registry with the ends of the bundle when the connectors are secured together;

wherein light passage through the fiber optic bundle creates a unique fingerprint at the second connector opening, which will be altered if the seal is broken.

2. The subject matter set forth in claim 1 wherein the first connector is a stepped member received within a similarly shaped recess formed in the second connector.

3. The subject matter set forth in claim 1 wherein the securing means comprises a retaining ring located on the first connector and received within a mating recess formed in the second connector, the ring maintaining contact with the first connector and expanding to fill the recess of the second connector upon securement of the first and second connectors.

4. The subject matter set forth in claim 1 together with locating means disposed on one of the connectors for engagement with a mating means formed in the second connector.

5. The subject matter set forth in claim 1 wherein certain of the optic fibers in the bundle are deliberately severed at an intermediate point along the length thereof to form terminations;

a window formed in the second connector for receiving the fiber terminations thereat;

wherein light passage through certain of the optic fiber terminations creates an additional unique "fingerprint" at the remaining terminations viewable at the window which fingerprint will be altered if a tool is forced into the second connector in the vicinity of the terminated fibers.

6. The subject matter set forth in claim 1 together with means formed in the second connector for aligning external viewing means in registry with the opening.

7. The subject matter set forth in claim 1 together with a hollow formed in the first connector for receiving the passage of a short length of optic fibers therethrough, the fibers being cut by a forced entry of a tool through the second connector, thus altering the "fingerprint" and enabling detection of tampering.

8. The subject matter set forth in claim 2 wherein the securing means comprises a retaining ring located on the first connector and received within a mating recess formed in the second connector, the ring maintaining contact with the first connector and expanding to fill the recess of the second connector upon securement of the first and second connectors.

9. The subject matter set forth in claim 2 together with locating means disposed on one of the connectors for engagement with a mating means formed in the second connector.

10. The subject matter set forth in claim 2 together with a hollow formed in the first connector for receiving the passage of a short length of optic fibers therethrough, the fibers being cut by a forced entry of a tool through the second connector, thus altering the "fingerprint" and enabling detection of tampering.

* * * * *